Feb. 24, 1948.  A. PACKARD  2,436,447
SWEEP CONTROL FOR PANORAMIC OSCILLOSCOPES
Filed May 23, 1944
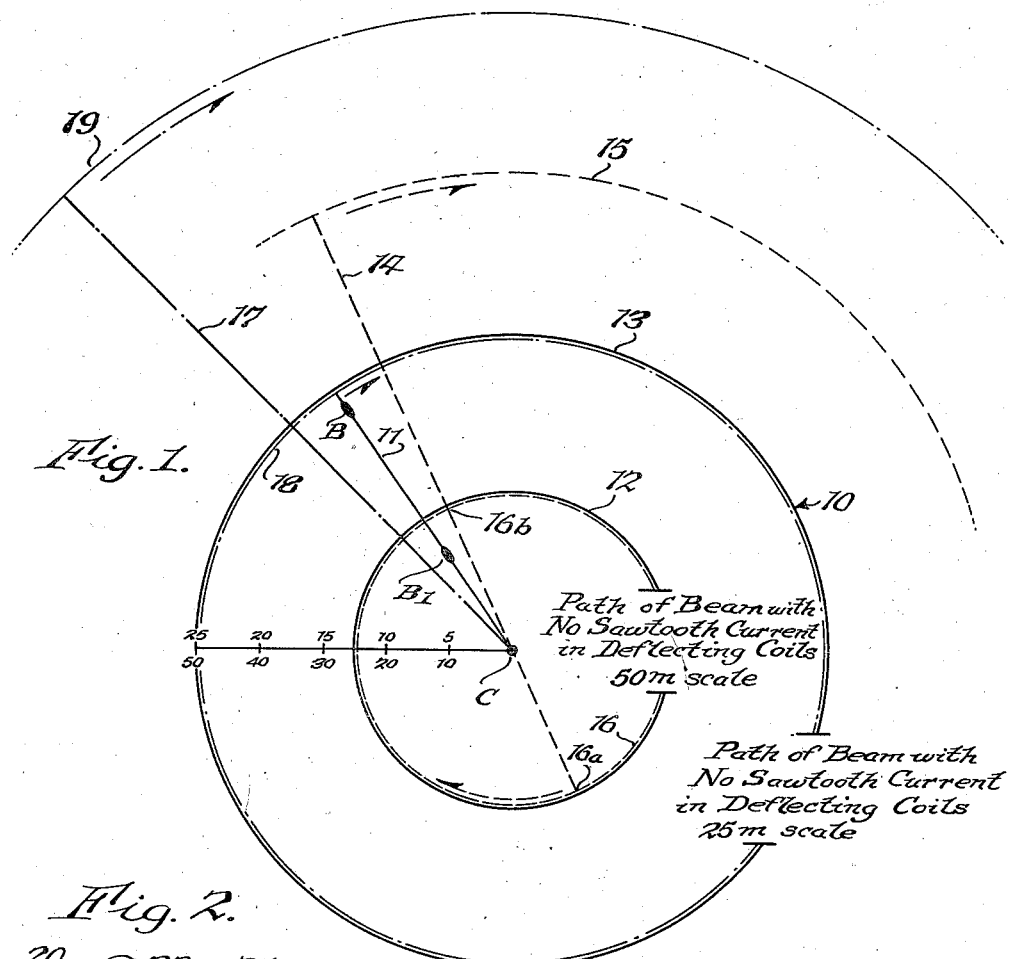
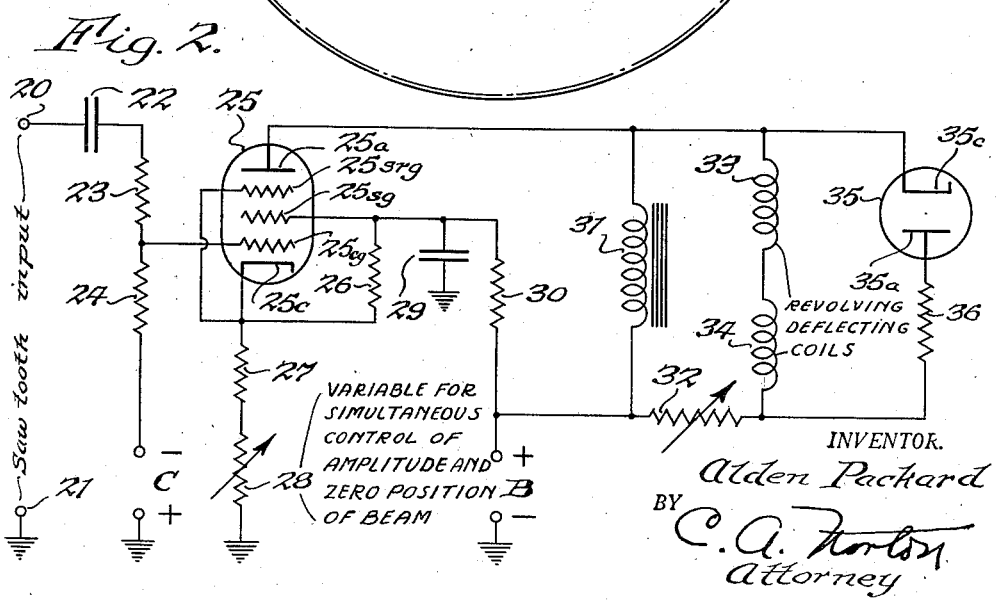
INVENTOR.
Alden Packard
BY C. A. Norton
Attorney Patented Feb. 24, 1948

2,436,447

UNITED STATES PATENT OFFICE 2,436,447

SWEEP CONTROL FOR PANORAMIC OSCILLOSCOPES

Alden Packard, Kenmore, N. Y., assignor to Colonial Radio Corporation, Buffalo, N. Y.

Application May 23, 1944, Serial No. 536,943

6 Claims. (Cl. 315—24)

This invention relates to sweep control for panoramic oscilloscopes such as are frequently employed in the viewing of a radar reflection pattern, although it will be understood that my invention may be applied for other purposes where it is desired to have the electron beam of a cathode ray tube trace a radius vector path around the screen of the tube, with its center of rotation at the center of the screen.

In such apparatus, and particularly in radar apparatus, the area to be examined may be, for example, that extending in a circle of 100-mile diameter having its center at the point of observation. As will be understood, when the transmitted waves are reflected back, an indication of the position of the reflecting object will appear on the screen, as, for example, a bright patch.

It is frequently desirable to change the range of the apparatus, or, in other words, the area to be observed; for example, assume that the observer notes a bright patch near the outer edge of the screen approaching the station, and continued observation shows this patch continuously approaching the observer's station. As it approaches, it may be desirable to enlarge the pattern to determine whether this patch indicates one plane or a number of planes. To do this, suppose the amplitude of the deflecting current is increased.

The mean center of the beam radially will remain unchanged, and since the deflection of the beam is increased, this expansion of the deflection will no longer permit the inner end of the trace of the beam to be on the center of the screen, but its inner end will move radially out and, if deflection is great enough, may pass off the screen entirely, so that the trace of the beam, instead of being a rotating vector, will now be a rotating diameter. This is likely to produce extreme confusion and result in erroneous readings.

It is an object of this invention to provide means for controlling the sweep of the electron beam so that, regardless of the scale used, the beam trace will always be in the form of a rotating vector having its center at the center of the screen.

It is a further object of this invention to provide means for moving the center of the excursion of the beam inwardly or outwardly to an extent just sufficient to keep the inner end of the beam trace on the center of the screen with changes in sweep amplitude.

It is a further object of this invention to so relate the control of the center of the beam excursion to the amplitude of the excursion in such a way that one control varies both the center of the excursion and the amplitude in such a manner that the inner end of the beam trace always remains at the center of the screen regardless of amplitude.

It is still a further object of my invention to provide control of the said factors which does not require readjustment of the center of the beam trace with variations in amplitude.

Still other objects and advantages of my invention will be apparent from the specification.

In this application I have particularly pointed out and distinctly claimed the part, improvement, or combination which I claim as my invention or discovery and I have explained the principles thereof and the best mode in which I have contemplated applying those principles so as to distinguish my invention from other inventions.

In the drawing,

Fig. 1 is a view of the screen of a panoramic oscilloscope showing various beam paths.

Fig. 2 is a circuit diagram of apparatus in accordance with my invention.

Referring now more particularly to Fig. 1, 10 designates the screen of a panoramic oscilloscope. This may be assumed to be connected to radar equipment so that the observer can examine a circular area having a radius of 50 miles and having its center at the point of observation. In operation, as will be understood, the electron beam, when adjusted to cover this 50-mile radius, traces out a path indicated at 11 in the form of a solid line rotating about the center of the screen and having its inner end at the center C of the screen.

As will be understood, adjustments are so made that in operation the beam trace is not visible except when reflected waves are received from an object in the area, in which case a bright patch will be observed at the point B on the screen each time the beam passes over it, all other parts of the screen being dark.

If the apparatus is adjusted for use with the 50-mile scale indicated, the observer will note that this object is approximately 45 miles from his post of observation and has a bearing of approximately 325°. Suppose it is noted that the object moves progressively toward the observer's post until it reaches the position indicated at $B_1$ approximately 15 miles from the observer's post. It may then be desired to examine the object more closely, and for this purpose the sweep range will be expanded to provide greater detail.

Suppose it is desired to expand the sweep by a ratio of 2 to 1. The scale distance which formerly represented 50 miles will now represent only 25 miles. Under the conditions just described, i. e., with a scale of 50 miles, the center of the beam excursion would be circle 12 at 25 miles radius, and if no saw-tooth current were applied to the deflecting coils, the trace of the beam would be the circle 12. With the saw-tooth current applied of a value to establish 50 miles as the radius to be observed, the outer limit of the beam's excursion will be the circle 13 at the edge of the screen and the inner end of the excursion will be at the center C.

Assuming now that the deflection currents are multiplied 2 to 1 to reduce the area observed to a radius of 25 miles and no other change is made, the new trace of the beam would be represented by the dotted straight line 14, the trace of its outer extremity will now be represented by the dotted circle 15, and the inner extremity of its excursion by the trace of the dotted circle 16.

Two things will immediately be observed. The portion of the excursion from circle 13 to circle 15 will not be observable in any event because all of this lies beyond the edge of the screen. Second, it will be seen that on its inner excursion the beam sweeps past the center C until it reaches the circle 16, and the radius of 25 miles to be observed will be covered by the trace from point 16a to point 16b. Attempts to read from the screen the position of objects under such conditions may result in serious confusion and incorrect readings.

To prevent this, it is desirable that the inner end of the beam excursion always remain at the point C regardless of its amplitude; that is to say, in the example given, when expanding the scale to observe a radius of 25 miles instead of 50 miles, the inner end of the trace of the beam path should remain at C and its outer end should be twice as far from the center of the screen as the circle 19. The desired trace is 17.

This requires that the center of the excursion of the beam be moved from the circle 12, where it was for 50 miles, to the circle 18. Under such conditions, by applying a 25-mile scale to the screen, correct readings can be attained in terms of the new or 25-mile scale. No interpretation is necessary.

The trace of the beam is determined by two factors. In the absence of saw-tooth current in the deflecting coils, the trace of the beam is a circle whose center is the center of the screen, the radius of which is determined by the current then flowing in the deflecting coils. This in turn is determined by the static current of the scanning amplifier, which flows through the deflecting coils.

The beam is made to rotate by rotation of the deflecting coils in a manner described in the joint co-pending application of Hulburt C. Tittle, Clifford J. Bull, and myself, entitled "Improvements in radar apparatus," Serial No. 518,400, and not necessary to be described for the purposes of this invention.

It will be clear that superimposing a saw-tooth current upon this static current in the deflecting coils will cause radial deflection of the beam, and in order to have the inner end of the beam excursion always coincide with the center of the screen, the amplitude of the static current must be related to the saw-tooth current in such a way that if the amplitude of the excursion is multiplied by 2, the radius of the center of the excursion must also be multiplied by 2.

Similarly, if the amplitude of the excursion is divided by 2, the radius of the center of the excursion should be divided by 2. When this is done, the trace of the beam will be a rotating vector, the center of which will coincide with the center of the screen for any amplitude of excursion.

I have provided a circuit for accomplishing this result which simultaneously regulates the static deflecting current in accordance with the amplitude of the excursion so as to maintain the center of the vector always in the center of the screen. This eliminates the readjustment or recentering of the beam whenever changes in the excursion amplitude were made, as has heretofore been necessary. This may be accomplished by the circuit shown in Fig. 2, as follows:

In this figure, tube 25 may represent a scanning amplifier and may be a beam power tube or pentode, the latter being shown. The tube may have cathode 25c, control grid 25cg, screen grid 25sg, suppressor grid 25srg, and anode 25a. Saw-tooth voltage from a suitable saw-tooth source of supply may be applied between terminals 20 and 21, the latter being grounded, and the former being connected through condenser 22, resistances 23 and 24, and suitable source of C bias potential to ground.

Cathode 25c may be connected through resistance 27 and resistance 28 to ground, the latter being a variable resistance for control purposes. It will be noted that, contrary to conventional practice, resistors 27 and 28 are not by-passed. The suppressor grid 25srg may be connected to cathode 25c, the screen grid 25sg may be connected to ground through condenser 29, to cathode 25c through resistor 26, and to suitable +B potential through resistance 30, the negative side of the +B supply being grounded, and the anode 25a may be connected to one terminal of choke 31 and to one end of the deflecting coils 33 and 34, which may be series connected.

The opposite end of choke 31 may be connected to +B and the opposite end of the deflecting coils through variable resistor 32 to +B. The deflecting coils may be shunted by a damping diode 35 having a cathode 35c and anode 35a, the latter of which may be connected through resistor 36 and resistor 32 to +B.

The method of operation is as follows: Resistor 28 is set at 0 resistance and resistances 23 and 24 are so chosen in value that with resistance 28 set for 0 the maximum desired length of the sweep is obtained. Thereafter, by adjustment of resistance 32, choke 31, and deflection coils 33 and 34, the proper amount of static plate current of the tube 25 is permitted to flow through coils 33 and 34 so that the sweep line is displaced radially until its inner end coincides with the center of the screen.

Then, by properly proportioning resistances 26, 30, and 28, as resistance 28 is increased, degeneration increases, shortening the sweep line; and at the same time the combination of bleeder bias developed by resistances 26, 27, and 28, and the self-bias developed by resistances 27 and 28 decreases the static plate current of tube 25, and consequently the static or average plate current through the deflecting coils 33 and 34, in such a manner that the whole sweep line is shortened, and its average deflection point or center is moved in, resulting in its inner end always remaining at the center of the cathode ray tube screen.

While reference has been made to adjustment of resistance 32, and while the same is indicated on the drawing as variable, this is a factory or service adjustment, and once the proper values have been obtained, this resistance is left set. The only adjustment necessary in actual use to change from one scale to another is that of resistor 28. By reason of the connection of resistor 28 in the cathode lead to ground, unbypassed, variation of this resistor only provides simultaneously an increase or decrease in the amplitude of the beam deflection and a simultaneous shift of the center or average position of the beam, so related to each other that no matter what the amplitude of deflection is, the inner end of the beam trace is always on the center of the screen.

Decreasing resistance 28 provides the reverse action, as will be understood, so that it will be seen that once the apparatus has been put into proper adjustment, variation of resistance 28 is all that is necessary to change the range, and that this change not only changes the amplitude of the sweep, but also makes the necessary change of the center point of the sweep so that the inner end of the excursion always coincides with the center of the screen.

While it is possible to calculate the values of the various resistances to obtain the desired result, I find that proper values of these may be obtained by trial without too much difficulty.

While I have shown and described certain preferred embodiments of my invention, it will be understood that modifications and changes may be made without departing from the spirit and scope thereof, as will be clear to those skilled in the art.

As will be understood, the inclusion of resistances 27 and 28 unbypassed in the cathode lead to ground impresses between the cathode and control electrode of amplifier 25 a feedback voltage 180° out of phase with the voltage originally impressed on the control grid, whereby an increase of resistance 28 provides a decrease in the amplitude of the beam deflection. Simultaneously the static negative bias between the cathode and control electrode is increased, causing a decrease in the static or direct current in the plate circuit of tube 25.

This decrease in direct current moves the zero or center position of the beam by an amount just sufficiently so that the inner end of the rotating beam trace always remains at the center of the screen, and for this adjustment resistance 28 is the only scale control needed for operation.

As an example, the operator can shift the apparatus from the 50-mile scale to the 25-mile scale with nothing more than a turn of the control knob of resistance 28. As this resistance is changed, the observer, looking at the screen, will notice only an increase in the length of the rotating radius vector beam.

If it were not for the application of the invention herein disclosed, variation of the amplitude of the beam would cause the inner end of the beam trace to overlap or fall short of the center of the screen, thus confusing the operator and making it more difficult to interpret the screen picture.

I claim:

1. The combination with a cathode ray oscilloscope, of rotary deflecting coils surrounding said oscilloscope, a vacuum tube amplifier supplied with sawtooth waves, means for supply both the direct and alternating current output of said amplifier to said deflecting coils, a resistance in the cathode lead of said amplifier, and means for varying the effective value of said resistance whereby variation thereof varies the amplitude of deflection of the electron beam of the oscilloscope while maintaining the inner end of the deflected trace at the center of the oscilloscope screen.

2. The combination with a cathode ray oscilloscope, of means for causing the trace of the electron beam to be a rotating radius vector with its center at the center of the screen, said means comprising rotary deflecting coils surrounding said oscilloscope, a vacuum tube amplifier for supplying sawtooth currents to said deflecting coils, a connection from the output of said amplifier to said deflecting coils, said connection passing both alternating and direct current components, a resistance in the cathode lead of said amplifier, said resistor carrying the space current of said amplifier, and a single means for varying the value of said resistor in a manner to vary the deflection amplitude and maintain the inner end of the beam trace at the center of the screen for various deflection amplitudes.

3. The combination with a cathode ray oscilloscope, of rotary deflecting coils surrounding said oscilloscope and carrying direct and alternating current components for causing the trace of the beam to be a rotating radius vector with its center at the center of the screen, an amplifier tube, connections from the output of said tube to said deflecting coils for supplying direct and alternating currents thereto, and a variable resistance traversed by the space current of said tube, connected in the cathode lead thereof, whereby variation of said resistance produces variation of deflection amplitude of said beam while maintaining the inner end of the beam trace on the center of the screen.

4. The combination with a cathode ray oscilloscope, of rotary deflecting coils surrounding said oscilloscope and carrying direct and alternating current components for causing the trace of the beam to be a rotating radius vector with its center at the center of the screen, an amplifier tube having a cathode, an anode, and a control electrode, connections from said anode to said deflecting coils for passing both alternating and direct current components, and a variable resistance carrying the space current of said tube and connected in both the anode-cathode and cathode-control electrode circuits, whereby variation of said resistance changes the amplitude deflection of the electron beam and shifts its center position to maintain the inner end of the trace on the center of the screen.

5. The combination with a cathode ray oscilloscope, of rotary deflecting coils surrounding said oscilloscope, a vacuum tube amplifier supplied with sawtooth waves, means for supplying both the direct and alternating current output of said amplifier to said deflecting coils, a resistance in the cathode lead of said amplifier, the value of said resistance being so related to the constants of said circuit that variation thereof simultaneously varies the sweep amplitude and the zero position thereof in a manner to maintain the inner end of the beam trace at the center of the oscilloscope screen, and a scale control for varying said resistance.

6. The combination with a cathode ray oscilloscope, of rotary deflecting coils surrounding said oscilloscope and carrying direct and alternating current components for causing the trace of the beam to be a rotating radius vector with its center at the center of the screen, an amplifier tube having a cathode, an anode, and a control electrode, connections from said anode to said deflecting coils for passing both alternating and direct current components, and a variable resistance carrying the space current from said tube and connected in both the anode-cathode and cathode-control electrode circuits, the value of said resistance being so related to the constants of the circuit that variation thereof varies the amplitude of deflection and the zero position thereof in a manner to maintain the inner end of the beam trace always at the center of the screen regardless of deflection amplitude, and a scale control for varying said resistor.

ALDEN PACKARD.

REFERENCES CITED

The following references are of record in the file of this patent:

UNITED STATES PATENTS

| Number | Name | Date |
| --- | --- | --- |
| 1,535,329 | MacGregor-Morris et al. | Apr. 28, 1925 |
| 2,241,809 | De Forest | May 13, 1941 |
| 2,263,377 | Busignies et al. | Nov. 18, 1941 |
| 2,296,727 | Moore | Sept. 22, 1942 |
| 2,313,966 | Poch | Mar. 16, 1943 |

FOREIGN PATENTS

| Number | Country | Date |
| --- | --- | --- |
| 542,634 | Great Britain | Jan. 21, 1942 |

Certificate of Correction

Patent No. 2,436,447.

February 24, 1948.

ALDEN PACKARD

It is hereby certified that error appears in the printed specification of the above numbered patent requiring correction as follows: Column 5, line 34, beginning with the words "As will be" strike out all to and including the word and period "picture." in line 65 and insert the same two paragraphs after line 23, same column; and that the said Letters Patent should be read with this correction therein that the same may conform to the record of the case in the Patent Office.

Signed and sealed this 18th day of May, A. D. 1948.

[SEAL]

THOMAS F. MURPHY,
*Assistant Commissioner of Patents.*